Feb. 23, 1937.　　　　H. DEAN　　　　2,071,817

ENAMELWARE UTENSIL

Filed July 10, 1934

INVENTOR
Herbert Dean
by his attorneys

Patented Feb. 23, 1937

2,071,817

UNITED STATES PATENT OFFICE 2,071,817

ENAMELWARE UTENSIL

Herbert Dean, Mount Lebanon, Pa., assignor to Federal Enameling & Stamping Company, McKees Rocks, Pa., a corporation of Pennsylvania Application July 10, 1934, Serial No. 734,458

1 Claim. (Cl. 91—73)

This invention relates to utensils, particularly cooking utensils of the character formed of sheet metal and having a vitreous enamel coating therein, such utensils being commonly referred to as enamelware. The invention pertains further to an improved method for the manufacture of such ware.

Heretofore in the manufacture of the better quality enamelware, it has been the practice to manufacture the ware by first dipping the ware in a base coat of enamel, completely covering the ware with this base coat, treating it and firing it to mature the enamel. The base coat generally has been black. The ware has then been dipped one or more times in white or colored enamel slips to build up an outer coating of the desired thickness and color. There is one, and usually are two coats in addition to the base coat. In order to secure a uniform distribution of the enamel, the ware has to be completely immersed or dipped.

When the ware is finally fired and completed, it is covered all over with a relatively thick layer, inside and out, of vitrified enamel, this coating in the preferred grades of ware being as uniform as possible and, in reality, comprising two and usually three separate applications of enamel. The enamel so used is of a ceramic nature. It has a glassy surface. This glassy surface reflects heat, and if the enamel is of a light color, the lighter colors also add to the heat reflecting qualities of the coating. It has heretofore been proposed, in order to increase the thermal conductivity of the bottom, to leave the base coating on the bottom of the outside of the utensil exposed, applying the usual thickness of coating to all remaining portions of the vessel. This practice has been rather extensively followed, but it has been found that while the thermal conductivity of the bottom of the utensil has been increased, the life of the ware has been very seriously impaired, particularly on the inside of the bottom of the utensil where the enamel will separate entirely from the metal, leaving the metal free of any enamel protection at all on the inside of the utensil.

The present invention provides a utensil wherein the thermal conductivity of the bottom is further increased over wares as heretofore made, and wherein the coating of enamel on the inside of the utensil is equalized with the coating of enamel on the outside, thereby overcoming the tendency of the inside coating of enamel to separate from the metal.

Figure 1:
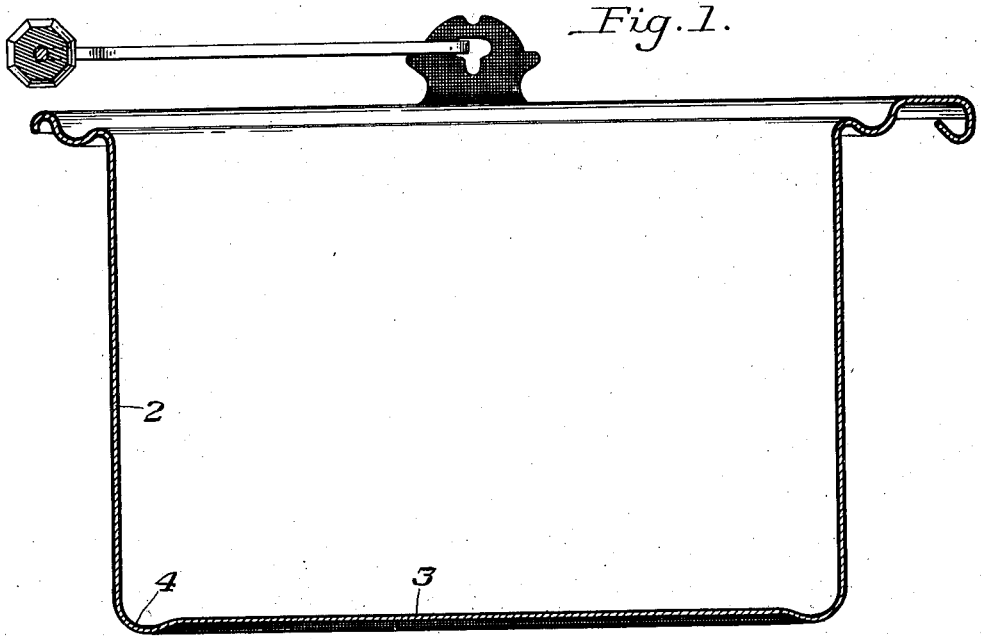
Figure 2:
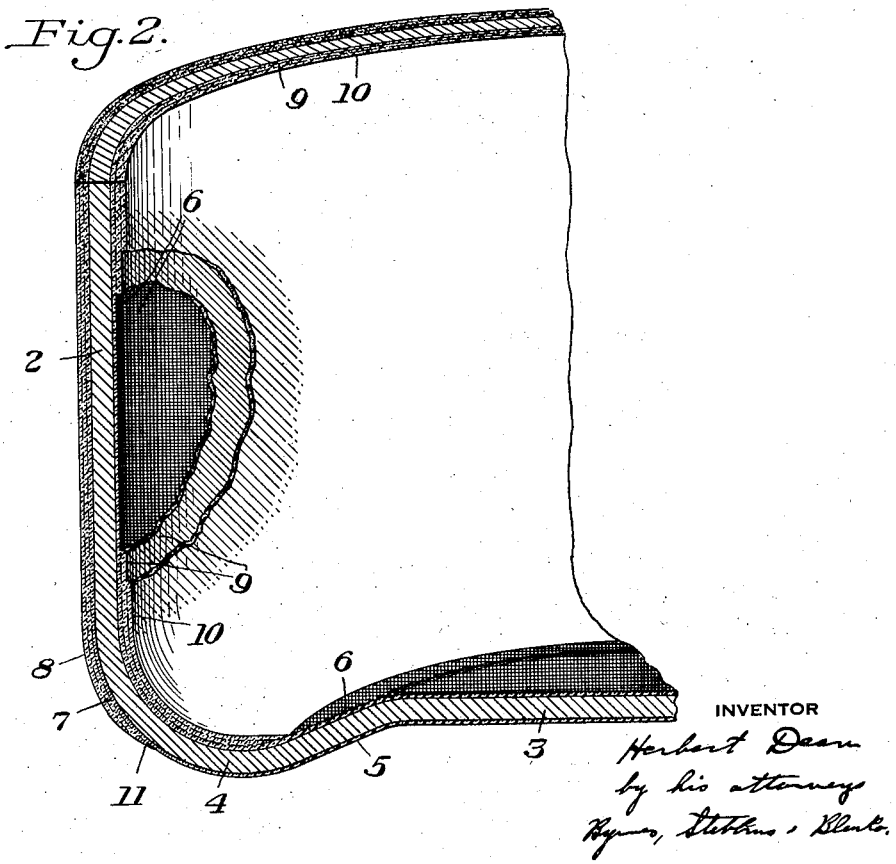

The invention may be readily understood by reference to the accompanying drawing, in which Figure 1 represents a transverse section through a conventional type of utensil, the thickness of the metal being indicated by the cross-hatched areas, and the thickness of the enamel being approximated by the heavy solid lines; and Figure 2 is a fragmentary view on a larger scale, illustrating the several layers of coatings on different portions of the utensil when made in accordance with the present invention.

According to the drawing, 2 designates the body of the pan or utensil. This, in the better grades of ware, is made of sheet metal of a fairly heavy gauge. The utensil is provided with a bottom 3, and the bottom 3 is preferably raised above or otherwise positioned out of the plane of the lowermost portion of the pan. In Figure 1, for instance, the bottom 3 is connected to the side walls 2 through a reversely curved corner portion 4, the corner portion extending below the main bottom 3.

Covering the entire outside of the vessel is a base coat 5 of enamel, and covering the inside of the vessel is a base coat 6. Over the base coat on the outside of the vessel are one or more additional coats. This is indicated in Figure 2, where there are two color coats 7 and 8, 8 being the outer of the two coats. Actually the coats 7 and 8 are fused together and fused into the base coat and do not remain as separate lamina. Likewise, on the inside of the side walls of the vessel over the base coat 6 are other coats, indicated in Figure 2 as 9 and 10, 10 being the external surface coating.

While, as stated above, the coats 7 and 8, and the coats 9 and 10 are actually fused together in the finished ware, they are separately applied by separate dippings or spraying. As clearly shown in Figure 2, the inside coats 9 and 10 extend down into the curved corner portion 4 of the vessel, and gradually taper off. Likewise, the surface coatings 7 and 8 extend down to the corner portion 4 and gradually taper off as indicated at 11.

The receptacle is thus provided with a bottom having a relatively thin base coat on the inside and the outside, but having a relatively thick enamel coating on the side walls. This has several advantages. In the first place, the black base coat on the bottom of the outside of the receptacle makes a more effective heat absorbing surface than would be provided if the colored coat on the outside extended across the bottom. As indicated at the beginning of this specification, where there is a thin coat on the outside of the receptacle and a relatively heavy coat across the bottom on the inside, the inequality in the thicknesses of the coatings creates a condition where the coating on the inside is particularly liable to come off in flakes, the base coating coming off with the color coating and leaving the metal exposed.

The present invention, by equalizing the thickness of the coating on the inside and out, equalizes the mechanical strains which tend to cause the enamel on the bottom of the inside to flake off. As a result of this, the ware is very much more durable than ware heretofore produced. Furthermore, by decreasing the thickness of the coating on the inside of the vessel, the heat may be transmitted more readily through the bottom and to the contents of the vessel. This may be one reason why the tendency of the enamel to flake off on the inside of the vessel is very materially reduced. The enamel, of course, is of a refractory nature and as such is not a good conductor of heat. The intense heat at the bottom of the pan passing into the metal has heretofore encountered a relatively thick refractory layer, which tended to retard the transmission of heat from the metal bottom to the contents of the vessel. The heat which was more effectively transmitted to the metal through the black bottom on the outside of the vessel, encountered a relatively thick insulating layer on the inside of the vessel. This produced thermal strains which is one of the probable reasons why enamel vessels made with only a base coating on the bottom of the outside and with the normal multiple coating on the bottom on the inside, did not stand up as well as would be expected and as well as vessels having multiple coatings on the bottom both on the inside and the outside.

Another advantage of the present invention is the fact that the bottom of the vessel is much more likely to be subjected to bending and buckling strains than are the side walls. The relatively thinner coating of enamel on the inside of the bottom of the vessel covers that area which is most subject to these warping and bending strains, while those portions of the vessel which are more rigid and less subjected to these strains have a relatively heavier coating. The thin coating can accommodate itself to the bending or give of the metal in the unsupported area of the bottom much more readily than can the heavier coating heretofore provided.

A cooking vessel embodying the present invention has a further advantage. The heat from the fire or stove is transmitted to the contents of the vessel through the bottom. The present invention provides for the protection of the bottom against corrosion, but offers a minimum resistance to heat transfer therethrough. The side walls of the vessel on the other hand, constitute an area from which the contents of the vessel can radiate heat to the surrounding atmosphere and objects. By providing a heavy side wall coating inside and outside the vessel of a ceramic nature, the heat insulating properties of the ceramic material are utilized to retard radiation through the side walls. Applicant therefore provides a vessel having a high thermal conductivity through the bottom and a relatively lower thermal conductivity through the side walls.

In manufacturing vessels according to the present invention, the metal form or base is dipped in the slip which forms the base coating. The ware is then fired to completely mature the base coating. This base coating is formed simultaneously on the inside and the outside of the vessel. Thereafter the vessel is dipped into or sprayed with the second coating and allowed to dry. Then it is dipped into or sprayed with the next coating and again allowed to dry. After it has received these outer coatings, the bottom will be covered with the coating material as well as the sides.

According to the present method, the bottom inside and out is then brushed to wipe off the coating material which is over the base coating. By reason of the fact that the bottom portion 3 of the vessel is preferably formed out of the plane of the corner 4, being shown as being raised above this portion, the coating material over the area 3 can be easily and evenly wiped off without disturbing the coating material on the sides and in the corner of the vessel. A brush can be used on the inside of the vessel on the surface 3 to wipe off this undesired coating material and expose the base coating. Without having the portion 3 bent out of the plane of the corner of the receptacle, this is somewhat more difficult to accomplish. It is not necessary, as far as the outside of the bottom is concerned, that the portion 3 be bent out of the plane of the corner, because in this case the outside of the bottom can be wiped clean without the operator disturbing the enameled material which is on the sides of the vessel.

While I have illustrated and described a particular shape of vessel, it will be understood that this is merely by way of illustration and that the invention is applicable to kettles and pans of various shapes.

It will also be understood that there may be any number of coatings over the base coatings on the side walls, the invention not being restricted to any definite number of coatings. This is determined by the finish of ware which is to be produced and the color which the vessel is to have.

I claim:

The method of making enamelware cooking vessels which comprises applying a base coating of enamel forming material uniformly over the entire surface of a thin metal vessel, firing the metal to mature the base coating, thereafter applying an additional coating of enamel-forming material over the entire vessel inside and out, drying the additional coating material, thereafter wiping the additional coating material off the main portion of the bottom of the vessel both inside and outside of the vessel, rendering the surfaces so wiped entirely free of the additional coating material and again firing the ware to mature the additional coating material remaining on the sides of the vessel.

HERBERT DEAN.